Sept. 7, 1965 J. S. WILLIAMSON ETAL 3,205,111
METHOD OF PRODUCING VENEER
Filed Feb. 8, 1961
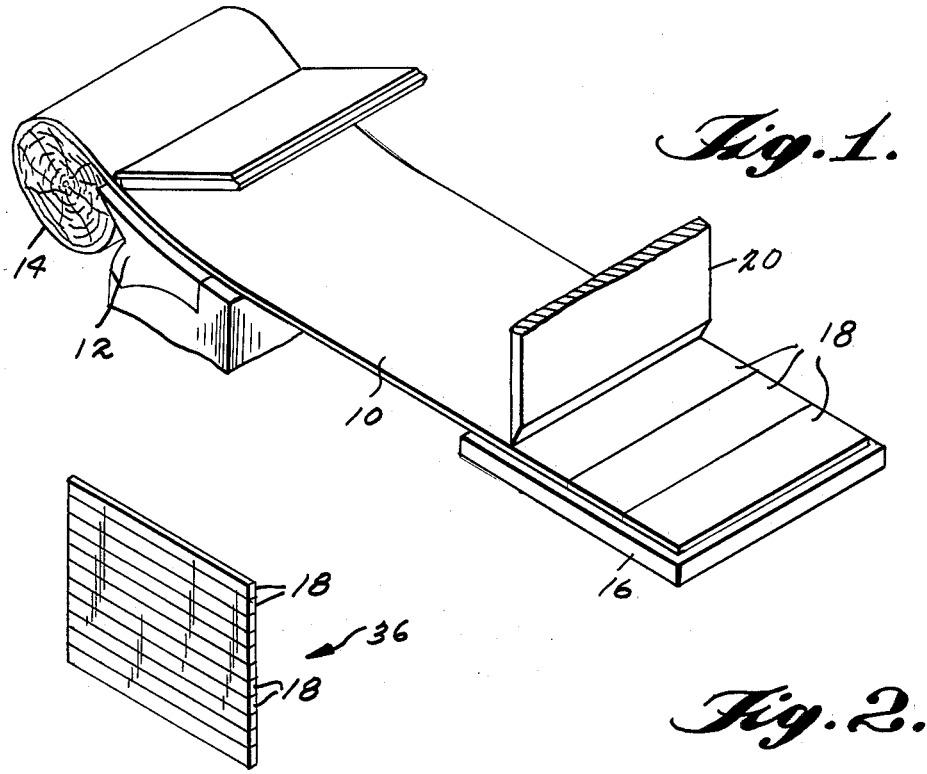
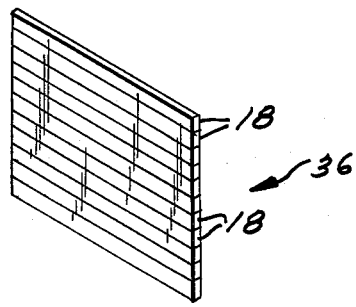
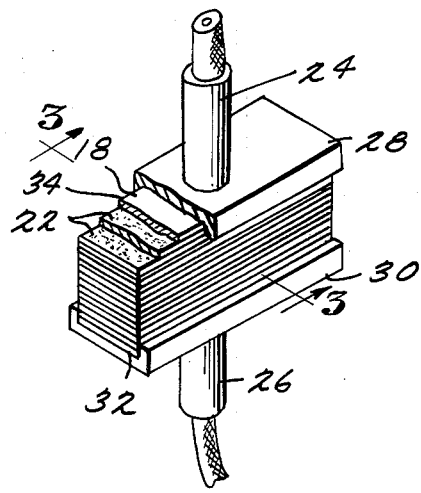
INVENTORS
JOHN S. WILLIAMSON
RICHARD B. WILLIAMSON
JOHN S. WILLIAMSON JR.
BY Cushman, Darby & Cushman
ATTORNEYS though the thickness of a sheet of veneer varies from application to application, the standard thickness of a sheet of face veneer is twenty-eight thousandths of an inch. Face veneer is normally cut from a laminated block in a veneer knifing machine.

United States Patent Office
3,205,111
Patented Sept. 7, 1965

3,205,111
METHOD OF PRODUCING VENEER
John S. Williamson, Richard B. Williamson, and John S. Williamson, Jr., all of Cockeysville, Md., assignors, by mesne assignments, to Hardwood Centre, Inc., a corporation of New York
Filed Feb. 8, 1961, Ser. No. 87,777
6 Claims. (Cl. 156—250)

The present invention relates to veneers, and, more particularly to a method through which the appearance of wood may be economically presented in a unique and novel manner.

This invention proceeds upon the principle of utilizing the moisture content of an adhesive mixture employed in bonding component layers of a laminated block in a controlled manner for increasing the electrical and thermal conductivity of the laminated unit so that heat may be uniformly transferred through the block to facilitate cutting on a veneer knife machine.

Accordingly, it is the primary object of the present invention to utilize a water containing adhesive mixture for raising the moisture content of the laminated unit within a preferred range whereby the electrical and thermal conductivity of the wood will be controlled to permit the transfer of heat necessary for cutting on a veneer knife machine.

It is a further object of this invention to provide an economical method for producing sheets of wood veneer, the length and pattern of which may be selectively controlled in the course of manufacturing by varying the several physical characteristics of the component layers.

An additional object of the present invention resides in the utilization of a high frequency electrical field for elevating the temperature of a laminated unit to facilitate cutting with a veneer knife.

Other objects and the entire scope of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent as the description herein progresses taken with the accompanying drawings, wherein:

FIGURE 1 is a perspective view of a continuous sheet of veneer stripped from a log and cut into widths of the desired dimensions;

FIGURE 2 is a perspective view of the block formed by a plurality of adhesively joined laminations to which pressure and heat are being applied; and FIGURE 3 is a view taken along line 3—3 of FIGURE 2 and represents a sheet of veneer cut by a veneer knifing machine.

Face veneers produced in accordance with the present invention are sliced from the side of a laminated block on a plane perpendicular to the component glued layers by use of a veneer knife machine.

Heretofore, a veneer saw was the only device with which sheets of face veneer could be cut from a laminated block. However, the use of a veneer saw for the purpose of commercially producing this type of face veneer is economically unfeasible because a veneer saw removes a substantial portion of the material being cut. The kerf, or waste material removed by a veneer saw, varies from forty to one-hundred thousandths of an inch in thickness while the average thickness of face veneer is between twenty-eight and fifty thousandths of an inch. The disadvantage of excessive waste inherent in the use of a veneer saw is obvious but can be avoided by employing a veneer knife machine.

As is well known, a veneer knife machine entails no waste when used to cut face veneers from a block since each sheet is forced away from the block by the shearing action of the blade. Additionally, the use of a veneer knife results in a far greater rate of production over that of a veneer saw; the ratio being on the order of five to one. However, the use of a veneer knife machine requires that the temperature of the block be elevated to permit satisfactory cutting of high quality face veneer. The heating process is necessary to soften the wood fibers and thereby minimize the tearing effect encountered when the sheet of veneer is cleft from the block. As the temperature of the block is raised, the wood fibers become softened and are made more pliable, which renders them better able to withstand the stresses that develop when the sheet of veneer of which they are a part is forced through the obtuse angle formed by the knife and the nosebar of a veneer knife machine. Unless the block is properly heated to condition it prior to cutting, the veneer produced will display a rough, splintered face, having small cracks and in some instances, corrugations. These defects cause the veneer sheet to be of less than first quality and completely unsuitable for work where a high degree of surface finish is necessary.

Face veneer is customarily cut from hard woods which generally contain in their "green" state from forty-five to one-hundred seven percent moisture by weight. Wood is a cellular material somewhat similar in structure to a sponge. The holes in a sponge correspond to the "pores" or "cells" in wood, while the sponge substance itself may be likened to the "fiber" or "cell walls" of the wood. Water is present in all types of wood to a greater or lesser degree. For example, a block of "green" hard wood, as mentioned above, weighing a total of ten pounds may contain five pounds of water, with wood fiber making up the other five pounds of weight. This sample block would be referred to as having a one-hundred percent moisture content, since the weight of its water equals the weight of its fibers. The five pounds of water contained in the sample block of wood exists in two distinct forms; one part as bulk liquid (free water) held in the woods' cells as water is held in the holes of a sponge, and the other part as absorbed moisture held within the cell walls.

Before wood can be used as a component layer of a laminated block, the moisture content must be substantially reduced and must not exceed fifteen percent, otherwise it will inhibit the bonding action of any glue used in the laminating process. However, this presents a dilemma since heat is necessary for efficient cutting with a veneer knife and can only be transferred through the media of moisture contained in the wood rather than by the wood fiber. It is well known that dry wood is an excellent thermal insulator and tends to resist absorption of moisture once it has been dried. Therefore, the function of moisture contained in wood is vital to the understanding of this invention.

Electrical and thermal conductivity of wood

In an oven-dry condition containing substantially no moisture, wood fibers are excellent electrical and thermal insulators. Since the laminated block previously described is composed of layers of dried or cured wood which must be heated to facilitate cutting with a veneer knife, moisture must be reintroduced into the laminate otherwise the dried layers of wood will act as a thermal barrier.

The electrical and thermal conductivity of wood is practically a direct function of the bulk of water it contains. Successive reductions of moisture content below approximately thirty percent rapidly decrease the thermal conductivity of the wood. For example, Yellow Birch (*Betula lutea*) has a "K" factor (the measure of thermal conductivity in British thermal units per hour and per square foot of conducting material, with a temperature gradient of 1° F. per inch of thickness) of 0.851 at 3.51% moisture content, while the same factor is 1.294 at 34.83% moisture content. Thus the increased moisture has increased the thermal conductivity nearly 50%. It is of interest to note that this increase required the addition of eleven pounds of water per cubic foot of wood.

Further, at low moisture content, wood is normally classified as an electrical insulator, or dielectric, rather than as a conductor. The electrical resistance of wood varies greatly with moisture content, especially below the 30% level; increasing as the moisture content decreases. For example, the electrical resistance of wood may increase as much as $10^5$ times with a moisture content change of from 25% to 7%.

The dielectric constant for vacuum or dry air is unity and the dielectric constants for wood are proportional to density at a given moisture content. Since the structure and chemical composition of the cell walls of all wood species are essentially similar, and since the dielectric constant of water is approximately 81 as compared to 4.2 for oven-dry wood, it is evident that the dielectric constant of wood increases with an increase in moisture content.

While moisture is needed to permit the necessary transfer of heat within the block, too much moisture will tend to impair the bonding action of the glue. Thus, a carefully calculated and controlled amount of water must be introduced into the laminated unit to increase the thermal conductivity of the wood. However, neither moisture nor water can normally penetrate a wooden block to a depth greater than $\frac{1}{8}''$ to $\frac{1}{4}''$ from the exterior surface. Accordingly, this invention utilizes moisture contained in the adhesive mixture itself to provide the necessary moisture.

The instant invention provides for compacting a stack of glued veneer sheets into a laminated block and conditioning the unit for subsequent cutting on a veneer knife machine. The individual sheets of veneer are passed through a glue spreader which applies a water containing adhesive to both sides of each sheet although the same result can be achieved by applying the adhesive to one face of each sheet. The sheets are then stacked in a pile and the same is formed into a block by applying external heat and pressure to the pile of sheets during the curing of the water containing adhesive.

It will be noted that the application of heat and pressure to the stack of veneer sheets thus formed simultaneously cures the glue and conditions the block to make possible proper cutting on a veneer knife machine. The heat required to perform this dual function may be applied by any suitable means that will raise the temperature of the block's interior to a point at which the wood's fibers will be softened for satisfactory cutting on a veneer knife machine. Preferably, the required heating is done by placing the block within a high frequency electrical field produced by a generator drawing not less than .0340 nor more than .0420 kilowatt per minute per cubic foot of block from a 220 volt—60 cycle line power supply. It should be noted that this power factor is derived from the power line supplying the high frequency generator, since various units will operate at different efficiencies. It has been found that the ideal power loading at the aforementioned line supply is .0381 kilowatt per minute per cubic foot of block. Heating can also be done by placing the laminated block, while under pressure, in a receptacle and thereafter subjecting the same to an atmosphere of saturated steam or hot water.

The transfer of this externally applied heat within the laminated block is contingent upon the presence of a certain minimum amount of water uniformly dispersed within the cells and fibers of the wood. Prior to being made into the component layers of the laminated block, the veneer contained therein must be dried to a moisture content of from 4 to 8% by weight.

If external heat were applied to a block composed of this veneer without the introduction of supplemental moisture, no appreciable increase of temperature would occur within the block as noted above.

Referring to FIGURE 1 there is shown one manner in which a continuous strip of veneer 10 is stripped by knife 12 from a log 14 mounted in a suitable lathe to perform the stripping. The technique is old and need not be described in detail. There is shown in Patent 1,841,544, January 19, 1932, an apparatus for veneer stripping and clipping which may be used in the practice of the present invention.

The veneer strip 10 is fed onto a table 16 where the same is cut into strips 18 of the desired width by means of a reciprocated cutter 20, the cutter 20 may be operated manually or automatically and may also remove from the strip 18 any natural defects which would be detrimental to the appearance of the finished product. The strips of veneer 18 can be of any desired thickness and of any predetermined length and width.

In FIGURE 2, a block comprised of a plurality of the wood strip 18 cut as shown in FIGURE 1, is illustrated. Between each of the strips 18 is spread an adhesive mixture 22 comprised of liquid urea resin, powdered resorcinal resin, powdered phenolic resin, walnut shell flour, ethylene glycol and water. The above mixture is thoroughly mixed by stirring and delivered to the wood strip 18 by glue spreader which advantageously delivers from about 48 to 55 lbs. of adhesive mixture per thousand surface feet spread. The adhesive is cured under heat and pressure, for instance, by placing the laminated block between electrodes 24 and 26 operatively connected to platens 28 and 30. The electrodes 24 and 26 are operatively connected to a commercially high frequency generator (not shown) of any desired type. A wide variety of commercial generators may be used and generally, they employ from 1200 to 4000 volts at the electrode while the frequency most often employed varies from 5 to 7 megacycles although as high as 50 and as low as 1 megacycle can be used. The platens 28 and 30 apply an evenly distributed pressure perpendicular to the plane of the adhesively cured strip 18 of approximately 100–150 lbs. per square inch and the heating under pressuse is conducted for a time sufficient until the adhesive mixture has fully cured at least two inches in from the outer edges 32 and 34 of the block and until the entire block has reached a temperature from 165°–195° F.

In FIGURE 3 there is shown a veneer sheet cut with a veneer cutting knife perpendicular to the longitudinal axis of the laminate block.

The introduction of the required supplemental moisture can best be accomplished through careful control of the water content of the adhesive mixture used to effect the bond between the laminations comprising the block. Since every species of wood has a different density and specific gravity, the content of water in pounds varies from species to species even though the moisture content, as a percentage of its weight, is the same.

TABLE ONE

| Species | Specific gravity | lb./cu. ft. oven dry | Minimum, lb./cu. ft at 10% | Maximum, lb. cu ft. at 25% | Optimum, lb./cu. ft. at 17½% | Lb. of water add to dry for optimum |
|---|---|---|---|---|---|---|
| Ash, white | .55 | 40.075 | 41.825 | 44.450 | 43.140 | 3.065 |
| Basswood | .32 | 24.875 | 25.625 | 26.750 | 26.188 | 1.313 |
| Beech | .56 | 41.870 | 43.490 | 45.920 | 44.705 | 2.835 |
| Birch, yellow | .55 | 41.270 | 42.690 | 44.820 | 43.755 | 2.483 |
| Butternut | .36 | 25.225 | 26.675 | 28.850 | 27.763 | 2.538 |
| Cherry | .47 | 33.355 | 35.185 | 37.930 | 36.558 | 3.203 |
| Elm, Rock | .57 | 41.080 | 43.160 | 46.280 | 44.720 | 3.640 |
| Hickory, Pecan | .60 | 43.320 | 45.440 | 48.620 | 47.030 | 3.710 |
| Maple, Sugar | .56 | 42.190 | 43.730 | 46.040 | 44.885 | 2.695 |
| Oak: | | | | | | |
| Red | .56 | 40.995 | 42.865 | 45.670 | 44.268 | 3.273 |
| White | .60 | 44.295 | 45.965 | 48.470 | 47.229 | 2.923 |
| Walnut | .51 | 35.105 | 37.435 | 40.930 | 39.183 | 4.078 |
| Yellow Poplar | .40 | 28.050 | 29.550 | 31.800 | 30.675 | 2.625 |

The values for the specific gravity in the above table are those reported in Wood Handbook, Handbook No. 72, U.S. Department of Agriculture, 1955, pages 70–77. The weights per cubic foot (oven dry) expressed in pounds as well as the minimum, maximum and optimum weights (in pounds) at moisture contents of 10%, 25% and 17½%, respectively, are calculated from Table 7, pages 55–57 of the same handbook. To calculate the oven dry weight of, for instance, basswood, the second species shown above, from a per cubic foot weight value at 15% moisture content which is 26.0 pounds there is subtracted the weight adjustment value factor multiplied by the number of percent changes in moisture content, in this case 15. The adjustment value factor is found in column 4 of Table 7 in the handbook. This factor for basswood is 0.075. Thus, the weight of basswood per cubic foot at oven-dry conditions (substantially 0% moisture) is $26.0-(0.075 \times 15)=24.875$. To get the weight of basswood at 10%, 25% and 17.5% the same factor (0.075) is multiplied by 10, 25 and 17.5, respectively, and the result in each instance added to the oven dry weight.

$0.075 \times 10 = 0.750$ and $0.750 + 24.875 = 25.625$
$0.075 \times 25 = 1.875$ and $1.875 + 24.875 = 26.750$
$0.075 \times 17.5 = 1.3125$ and $1.3125 + 24.875 = 26.188$ The pounds of water added to the dry wood to reach optimum weight is calculated by subtracting from the weight computed at 17.5% moisture content the oven dry weight.

Thus, Table 1 indicates that a block composed of layers of basswood veneer requires only 1.313 pounds of water per cubic foot to reach optimum moisture content. This value as indicated is obtained by subtracting the weight of the basswood at oven-dry conditions (24.875 pounds) from the weight of basswood containing 17.5% moisture (26.188 pounds). The introduction of two much water, however, will result in failure of any commercial adhesive. Thus, the moisture contained within the laminated block must be high enough to permit the transfer of externally applied heat, yet low enough to allow the adhesive to securely bond the laminations together.

In practice of this invention, the component layers of veneer from which the block is to be made are first weighed carefully and the weight of water contained in them is computed by subtracting the oven dry weight of an equal volume of veneer of the same species from the actual weight of the veneers utilized in forming the block. Prior to the mixture of the adhesive, the weight of water naturally in the component veneers is subtracted from the weight of water desired in a theoretical block of the same species at optimum conditions. The indicated pounds of water provides the basis for the actual mixture of adhesive to be used. For example:

Species: Black walnut
Makeup: 435 pcs. 15" wide x 102" long x .03572" thick = 13.72 cu. ft.
Actual weight: 498.5 lbs.
Optimum weight:
  $39.183 \times 13.72 = 537.6$ lbs.
Less; actual weight = 498.5
Water in mix = 39.1 lbs.
Surface feet in block:

$$\frac{435'' \times 15'' \times 102''}{144''} = 4621 \text{ sq. ft.}$$

Optimum spread: 52 lbs. of adhesive/1000 feet of surface × 4.621 sq. ft. = 240.3 lbs. of adhesive mix
Mix = 39.1/7.5 lbs. = 5.21
Combine:

| | Lbs. |
|---|---|
| L–100 | 260.5 |
| CF 20 | 52.1 |
| S–10 | 24.45 |
| X–1 | 23.45 |
| Ethylene glycol | 13.03 |
| Water | 39.1 |
| Total | 403.81 |

While many types of water containing adhesive formulations may be used satisfactorily (providing the wood-moisture relationship is observed), a very satisfactory formulation is as follows:

| | Parts by weight |
|---|---|
| Perkins L–100—Liquid urea resin | 50 |
| Perkins CF–20—Powdered resorcinol resin | 10 |
| Perkins S–10—Powdered phenolic resin | 3 |
| Perkins X–1—Walnut shell flour | 4½ |
| Ethylene glycol | 2½ |
| Water | 7½ |

It will be noted that both the Perkins L–100 and the ethylene glycol contain a certain amount of water, the weight of which has been considered as free water in preparing the mixture for an individual block.

The adhesive mixture cited is particularly suited for use in this invention in that it provides a nearly invisible glue line in the sheet of veneer subsequent cut from the laminated block. The glue bond resulting from the use of this mixture also is highly water resistant and does not scratch or abrade the veneer knife during the slicing of sheets from the block. This mixture also fills small cracks or splits in the component veneer layers, which results in a better ultimate veneer sheet when sliced from the block.

The above mixture is thoroughly stirred and applied to both sides of the component veneer layers by a glue spreader delivering from 48 to 55 pounds of adhesive mixture per one thousand surface feet spread.

After being thus spread, the veneer layers are clamped together with a pressure of from 100 to 150 pounds per square inch to insure intimate contact of all surfaces. Several satisfactory means of delivering this pressure are readily available, and the actual device used depends largely upon the desired method of applying the external heat to the block. Thus, if a high frequency electrical field is used to supply heat, as mentioned before, the block may simply be compressed between the electrodes until the adhesive has cured. If a receptacle containing saturated steam or hot water is used, a bale may be formed with the veneer layers clamped between conventional caul boards as is a bale of plywood in the "cold press" method of plywood manufacture.

Regardless of the method employed to apply the external heat and pressure to the laminated block, heat must be maintained until the adhesive mixture has fully cured at least two inches in from the outer edges of the block, and until the entire block has reached a temperature of from 165° to 195° F. for proper cutting on a veneer knife machine.

It should be understood that the grain direction of each wooden layer extends in substantially the same direction throughout the laminated unit.

This application is a continuation-in-part of application Serial No. 426,503, filed April 29, 1954, now abandoned, wherein there is described a method for producing veneers and the resultant product, the entire disclosure of which is incorporated herein by reference.

While the invention has been described in its preferred embodiment, there will be various modifications apparent to those skilled in the art. Such modifications are considered to be within the spirit and scope of the appended claims.

What is claimed is:

1. The method of producing wood veneer which includes the steps of applying a water containing adhesive to the face of adjacent wooden layers each of said wooden layers containing less than 15 percent of residual moisture content by weight, stacking said layers in superposed relation to form an assembled unit, subjecting said unit to an external pressure ranging from 100 to 175 lbs. per square inch, elevating the temperature of said unit to between 165° and 200° F., and severing said unit at said elevated temperature transverse to the face of the layers of said unit to form separate veneer sheets.

2. The method of producing wood veneer as stated in claim 1 wherein the combination of the residual moisture content of said wooden layers when increased by water absorbed from said adhesive mixture ranges between 10 to 25 weight percent.

3. The method as described in claim 1 wherein the temperature of said unit is increased by subjecting the same to a high frequency electrical field.

4. The method as described in claim 3 wherein said high frequency electrical field is developed from the consumption of not less than .0340 nor more than .0420 kilowatts per minute per cubic foot of said unit.

5. The method of conditioning a laminated unit containing a plurality of wooden layers each of said layers containing less than 15 percent residual moisture content by weight arranged in superposed relation for subsequent cutting into veneer sheets comprising the steps of interposing a water containing adhesive between adjacent layers for bonding the same together and simultaneously increasing the moisture content thereof to substantially raise the thermal conductivity of said unit, applying pressure between 100 and 175 lbs. per square inch to said unit to assure intimate contact between said adjacent layers and subjecting said unit to an elevated temperature between 165° and 200° F. whereby heat is transmitted throughout the unit by means of said increased moisture content to facilitate slicing into veneer sheets.

6. The method of producing a laminated unit comprising the steps of stacking a plurality of wooden layers in superposed relationship whereby the grain of each of said layers extends in substantially the same direction, each of said layers containing 4 to 8 percent residual moisture content by weight interposing a water containing adhesive mixture between each of said layers, said water containing adhesive increasing the moisture content of said unit to at least 10 weight percent of water per cubic foot, applying pressure of at least 100 lbs. per square inch to said unit during the curing of said interposed adhesive mixture, elevating the temperature of said unit to between 165° and 200° F. by subjecting the same to a high frequency electrical field, and cutting veneer sheets from said unit when its internal temperature is at least 165° F.

References Cited by the Examiner

UNITED STATES PATENTS

| | | | |
|---|---|---|---|
| 1,921,184 | 8/33 | Hartzell | 144—324 |
| 2,053,173 | 9/36 | Astima | 156—250 |
| 2,245,170 | 6/41 | Von Ende et al. | 41—35 |
| 2,512,418 | 6/50 | Cornwell | 260—6 |
| 2,591,771 | 4/52 | Bergey | 156—273 |

EARL M. BERGERT, *Primary Examiner.*

CARL F. KRAFFT, *Examiner.*